Aug. 24, 1965
R. F. HOLBROW
3,202,460
WHEEL COVER FOR ROAD VEHICLES
Filed March 11, 1964
2 Sheets-Sheet 1
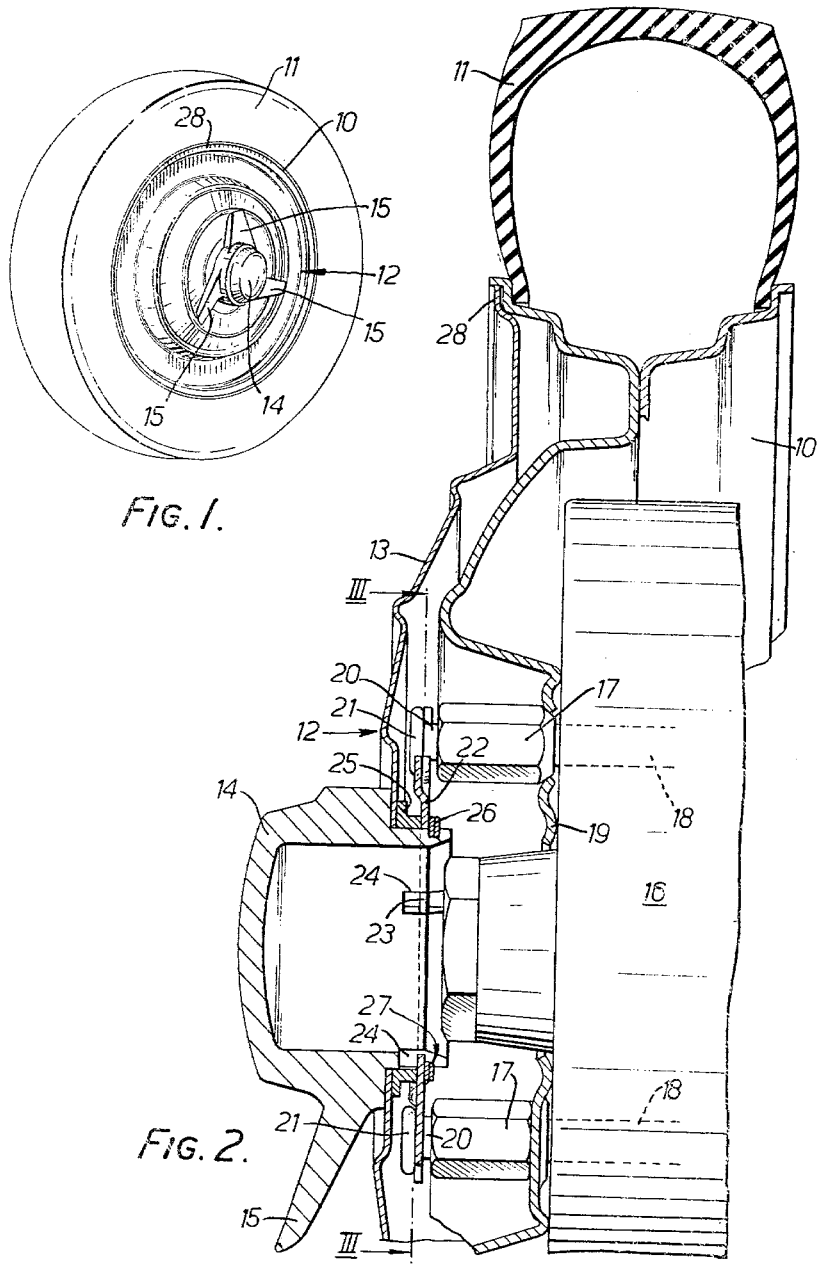
INVENTOR
RICHARD FREDERICK HOLBROW
BY
ATTORNEY Aug. 24, 1965   R. F. HOLBROW   3,202,460
WHEEL COVER FOR ROAD VEHICLES
Filed March 11, 1964   2 Sheets-Sheet 2

INVENTOR
RICHARD FREDERICK HOLBROW
BY
ATTORNEY

United States Patent Office 3,202,460
Patented Aug. 24, 1965

3,202,460
WHEEL COVER FOR ROAD VEHICLES
Richard Frederick Holbrow, Creek End, Burcot,
Oxfordshire, England
Filed Mar. 11, 1964, Ser. No. 351,124
Claims priority, application Great Britain, Mar. 12, 1963,
9,832/63; July 16, 1963, 28,031/63
3 Claims. (Cl. 301—37)

This invention concerns improvements relating to hub cap devices for fastening to vehicle road wheels. The term hub cap is used to cover a hub cap or an embellishing plate or a combined cap and embellishing plate. The road wheels are of the type in which a wheel-carrying member (e.g., a brake housing) has screw-threaded wheel monuting studs which project therefrom to pass through a hub portion of the wheel, wheel retaining nuts being threaded on the studs to draw the hub portion against said member thereby to secure the wheel to the vehicle. For the purposes of the invention, the studs have to be headed and each such stud head may be delimited by a circumferential groove in the stud or in a nut, preferably the wheel retaining nut, mounted on the stud; the term "headed stud" is to be construed accordingly.

According to the present invention there is provided a hub cap device for fastening to a vehicle road wheel secured to the vehicle by means of headed studs as hereinbefore defined, the device comprising a hub cap of generally disc form, a boss rotatably mounted centrally on said cap for rotation relative to the cap and wheel, a fastening member of substantially plate form secured to said boss for rotation therewith, hook means formed integrally with and in a plane of such fastening plate for engagement behind the stud heads upon rotation of said boss and fastening plate in one direction, and locking means formed integrally with said fastening plate to engage the stud heads and prevent inadvertent disengagement of said hook means from the stud heads.

Figure 3:
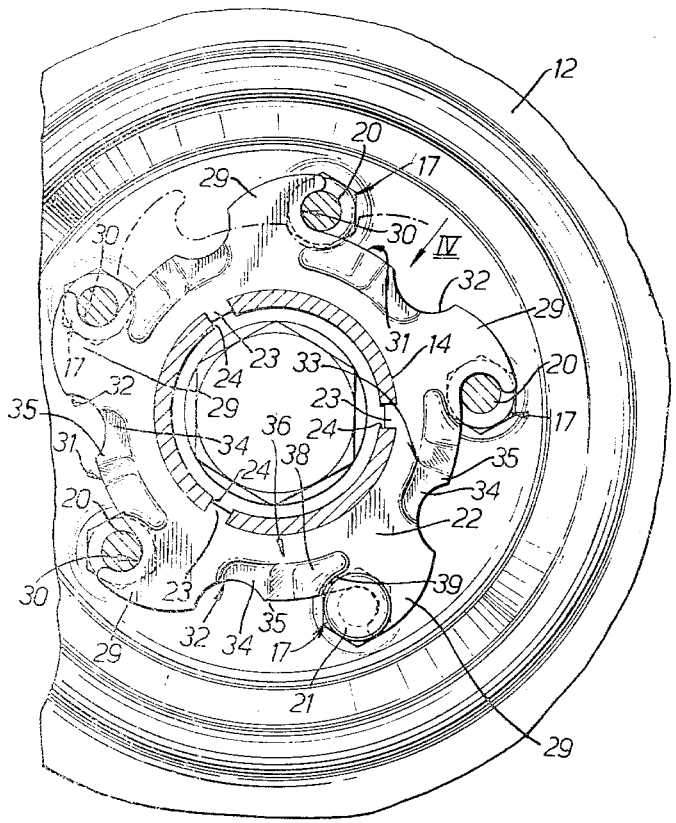
Figure 4:
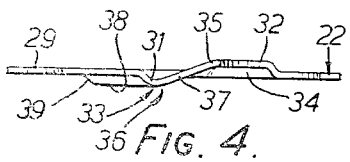

An embodiment of the present invention will now be described, by way of example only, with reference to the accompanying drawings whereof:

FIG. 1 is a perspective view of a wheel for a motor car incorporating a hub cap according to this invention, FIG. 2 is a transverse section of a part of the wheel of FIG. 1 and to a larger scale, FIG. 3 is a sectional view on the line III—III of FIG. 2, FIG. 4 is a view in the direction of arrow IV of FIG. 3 showing to an enlarged scale a part of a fastening member having a hook means as set forth above.

Referring to FIG. 1: the car wheel 10 carries a pneumatic tyre 11 in known manner and a hub cap generally indicated at 12. The hub cap 12 comprises a combined hub disc and embellishing plate 13 and a boss member 14 rotatably mounted centrally on disc 13. Member 14 is formed with radially projecting arms 15 to facilitate its rotation by hand or by a suitable tool.

The wheel 10 (see FIG. 2) is secured to a wheel-carrying member (the brake housing 16) by nuts 17 threadedly mounted on studs 18 which project from housing 16 and pass through a hub portion 19 of wheel 10. In the arrangement of FIGS. 2 and 3 there are five equi-angularly spaced studs and nuts but of course these may be more or less as is appropriate.

Each nut 17 has a circumferential groove 20 thereby to form a head 21.

The disc 13 has a central hole to receive the member 14 so that the latter is freely rotatable in the disc. A fastening ring member 22 of substantially plate form is mounted on member 14 (see also FIG. 3). Member 22 has three equi-spaced, inwardly projecting lugs 23 each of which is received in a slot 24 in member 14. Rotation of boss 14 is therefore transmitted to ring member 22. A spacing member 25 lies between disc 13 and member 22 and the several parts are held assembled by a spring clip 26 of any known or convenient construction which is received in a circumferential slot 27 in member 14 (FIG. 2). When the hub cap assembly is presented to wheel 10 the edge 28 of disc 13 is pressed against the wheel and there is therefore considerable frictional resistance to rotation of the disc. The boss member 14 is readily rotatable relatively to the disc and therefore member 22 is readily rotatable relatively to studs 18 and their nuts 17.

Consider now FIG. 3: member 22 is formed with five equi-spaced, hook members 29, one for each nut 17. Each hook member 29 is constituted by a C-shaped projection to enter a groove 20 of its associated nut 18, the inner face 30 of the C-projection closely fitting the grooved portion of the nut. Face 30 is extended to form a circumferential face 31 which on rotation of member 22 moves freely beneath the grooved portion of the nut and closely thereto. Face 31 leads into a part-circular recess 32 having a radius of curvature slightly greater than the maximum radius of the head 21. The angular distance from a hook member 29 to its associated recess 32 is such that when the recess is aligned with a nut 18 the hook member 29 is fully disengaged from the nut (see the chain-dotted position in FIG. 3).

Assuming that the hub cap assembly is presented to the wheel with the hook members 29 between nuts 18 (the chain-dotted position of FIG. 3) so that recesses 32 are aligned with nuts 17 and that the member 22 is moved towards the nuts and past heads 21, as is permitted by recesses 32: if now boss member 14 is turned clockwise (as seen in FIG. 3) the hook members 29 are moved into grooves 20 until faces 30 abut the grooved portions of the bolts. The member 22 is thereby secured to the nuts 18 (and hence to the studs 17) whereby the hub cap assembly is attached to the wheel. To prevent inadvertent disengagement of members 29 from nuts 17 the locking means referred to is provided. The construction and operation of the locking means will now be described.

A locking means is generally indicated at 33 (see FIGS. 3 and 4). As seen from FIG. 3 the locking means is between each recess 32 and its associated hook member 29. For each means 33 there is a depression 34 which extends over about one-half of the circumference of part-circuar recess 32 and partly along face 31, at 35. Depression 34 is to that side of the plane of member 22 which faces towards the nuts 17. Immediately adjacent depression 34—and between the latter and the hook member 29—there is a raised portion 36 (i.e., a portion on that side of the plane of member 22 which faces away from the nuts 17) comprising a sloping or cam-like part 37 and a flat topped or plateau part 38. Cam 37 extends smoothly from depression 34 to plateau 38. The latter has a part-circular edge 39 which is co-axial with face 30 and slightly greater in diameter than the head 21. When boss member 14 is turned clockwise as described above the head 21 (which is assumed to be aligned with recess 32) engages the cam-like part 37 and with continued rotation of the boss member the head rides up part 37 and on to plateau 38. This draws the member 22 inwardly towards hub portion 19 and presses the edges 28 of disc 13 strongly against the wheel. On further clockwise rotation of boss member 14 the plateau 38 is moved past head 21 so that it lies alongside the head with edge 39 around and close to the peripheral edge of head 21 (see the bottom, right-hand corner of FIG. 3 wherein one of the heads 21 is illustrated in this position). The edge 39 co-acts with head 21 to prevent anti-clockwise roatation of member 22 so that the disc 13 can not inadvertendly come off the wheel.

As the cam-like part 37 moves across head 21 the member 22 is deformed such deformation being accommodated by the resilience of member 22.

Edge 39 is more steeply inclined to the plane of member 22 than the cam-like part 37 and at such an angle as to prevent inadvertent anti-clockwise movement of member 22. The edge 39, however, does permit raised portion 36 to be moved past the head upon deliberate anti-clockwise rotation of boss member 14.

The studs 18 may receive and pass through the conventional wheel nuts, each stud having a circumferential groove to be engaged by a hook member instead of engaging the special nuts described above. In either event of course the studs are provided with a head.

While it is preferred to provide a locking means 33 for each hook member this is not essential; the locking means may be associated only with certain hook members. Again while it is preferred to provide a hook member 29 and associated locking means 33 for each wheel nut it may be arranged that a member 29 and mean 33 are provided only for certain of the wheel nuts.

I claim:

1. A hub cap device for fastening to a vehicle road wheel secured to the vehicle by means of headed studs as hereinbefore defined, the device comprising a hub cap of generally disc form, a boss rotatably mounted centrally on said cap for rotation relative to the cap and wheel, a fastening member of substantially plate form secured to said boss for rotation therewith, hook means formed integrally with and in a plane of said fastening plate for engagement behind the stud heads upon rotation of said boss and fastening plate in one direction, and locking means formed integrally with said fastening plate to engage the stud heads and prevent inadvertent disengagement of said hook means from the stud heads.

2. A device according to claim 1 wherein for each hook means said fastening plate is formed with a recess to enable said plate to be brought behind the stud heads, and each associated locking means is angularly spaced from said hook means and between said hook means and its associated recess and comprises a portion raised from the plane of the plate which portion is carried past the associated stud head with resilient deformation of the plate upon rotation of the plate to engage the hook means behind the stud heads.

3. A device according to claim 2 wherein said raised portion comprises a sloping cam-like part extending angularly from said recess towards the hook means and presents an edge part to lie closely adjacent the peripheral edge of the stud head in the engaged and locked position of said fastening plate.

References Cited by the Examiner

UNITED STATES PATENTS

| 1,611,069 | 12/26 | Putnam | 301—9 |
| 2,159,881 | 5/39 | Booth | 301—37 |
| 2,217,086 | 10/40 | Whitacre | 301—108 |

FOREIGN PATENTS 760,208  12/33  France.

BENJAMIN HERSH, *Primary Examiner.*

ARTHUR L. LA POINT, *Examiner.*